(12) United States Patent  (10) Patent No.: US 7,143,472 B2
Hicks  (45) Date of Patent: Dec. 5, 2006

(54) CASTER THREAD GUARD AND CASTER ASSEMBLY

(76) Inventor: Gary Dwayne Hicks, 38272 Willow Ct., Murrieta, CA (US) 92562

( * ) Notice: Subject to any disclaimer, the term of this patent is extended or adjusted under 35 U.S.C. 154(b) by 113 days.

(21) Appl. No.: 10/959,841

(22) Filed: Oct. 6, 2004

(65) Prior Publication Data

US 2005/0076470 A1 Apr. 14, 2005

Related U.S. Application Data

(60) Provisional application No. 60/510,464, filed on Oct. 10, 2003.

(51) Int. Cl.
*B60B 33/00* (2006.01)

(52) U.S. Cl. .................................. 16/18 CG

(58) Field of Classification Search ............ 16/18 CG, 16/42 R, 19, 42 T; 248/188.9, 345.1; 301/105.1, 301/108.1, 108.3
See application file for complete search history.

(56) References Cited

U.S. PATENT DOCUMENTS

| 1,285,142 | A | * | 11/1918 | Happensack | ............. | 16/18 CG |
| 1,432,966 | A | * | 10/1922 | Loucien | ......................... | 16/45 |
| 2,523,659 | A | * | 9/1950 | Heffernan | ................ | 16/18 CG |
| 2,554,462 | A | * | 5/1951 | Huber et al. | ............. | 16/18 CG |
| 2,742,663 | A | * | 4/1956 | Meadows | ....................... | 16/40 |
| 3,801,129 | A | * | 4/1974 | Kotzin, Jr. | .................. | 280/855 |
| 3,807,817 | A |   | 4/1974 | Black | | |
| 3,847,665 | A | * | 11/1974 | Quint | ............................. | 134/6 |
| 3,868,745 | A | * | 3/1975 | Jamison | ......................... | 16/41 |
| 4,592,595 | A |   | 6/1986 | Freeman | | |
| 5,211,213 | A |   | 5/1993 | Hicks | | |
| 5,275,472 | A |   | 1/1994 | Hicks | | |
| 5,303,449 | A | * | 4/1994 | Gray | ....................... | 16/18 CG |
| 5,690,395 | A |   | 11/1997 | Hicks | | |
| 6,367,885 | B1 |   | 4/2002 | Denner et al. | | |
| 6,854,159 | B1 | * | 2/2005 | Ruitenbeek | ................. | 16/18 R |

FOREIGN PATENT DOCUMENTS

| GB | 1443936 | A | * | 7/1976 |
| JP | 61077501 | A | * | 4/1986 |
| JP | 09156303 | A | * | 6/1997 |
| JP | 2000203207 | A | * | 7/2000 |

* cited by examiner

*Primary Examiner*—Chuck Y. Mah
(74) *Attorney, Agent, or Firm*—Geoffrey A. Mantooth; L. Bruce Terry

(57) ABSTRACT

A caster includes a yoke having a yoke leg with a yoke leg axle opening through the yoke leg. A wheel having a hub and a hub axle opening through the hub is attached to the yoke leg with an axle bolt. A thread guard is located between the hub and the yoke leg. The thread guard has a disk-shaped body with a thread guard axle opening through the body for receiving the axle bolt. The thread guard further includes an outer surface facing toward the yoke leg and an inner surface facing toward the hub, and the outer surface includes a raised ridge extending away from the body. The ridge substantially surrounds and conforms to the shape of the yoke leg. The ridge preferably extends from the body past the outer surface of the yoke leg.

26 Claims, 8 Drawing Sheets

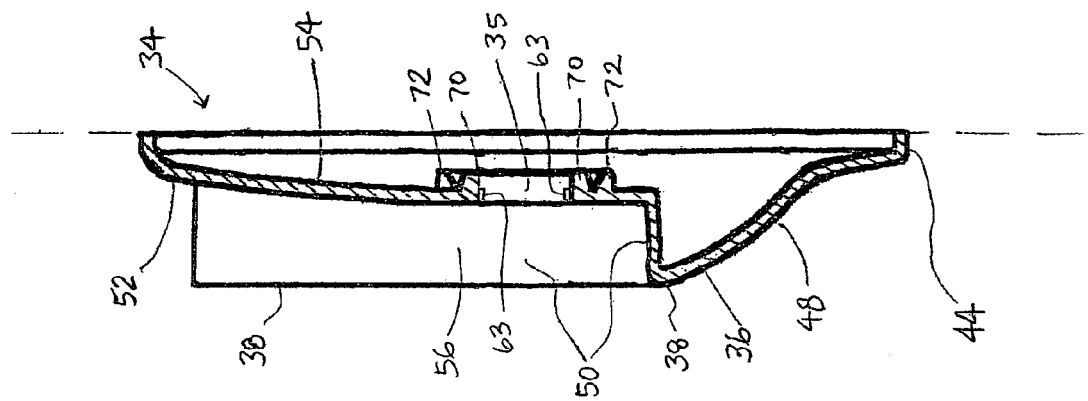
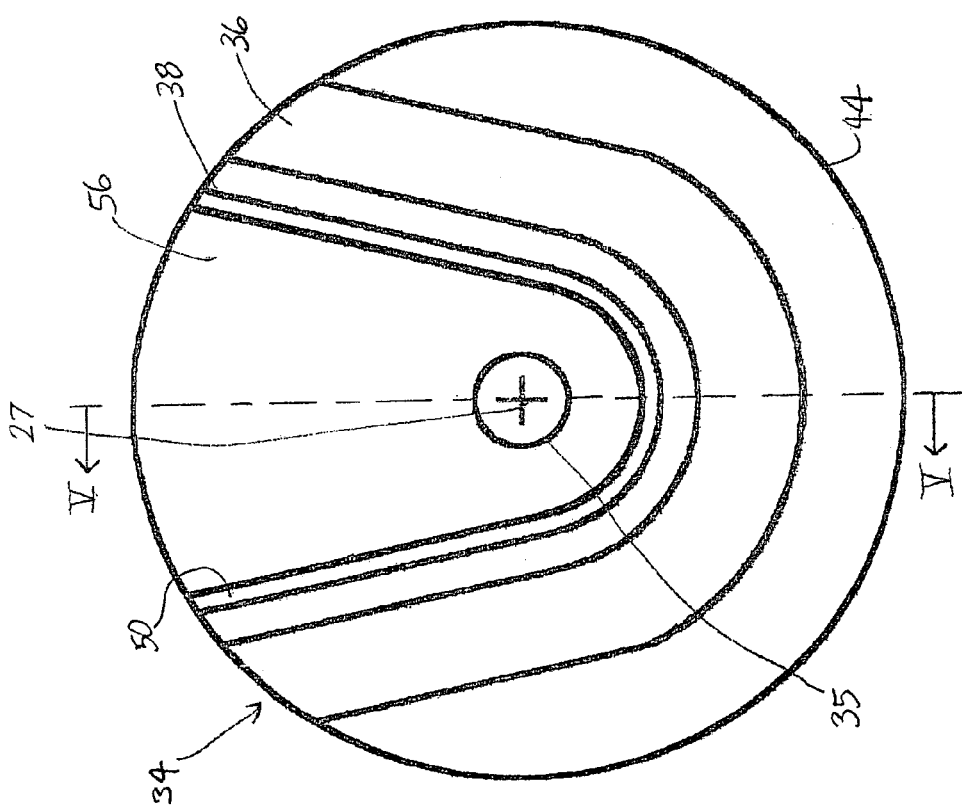

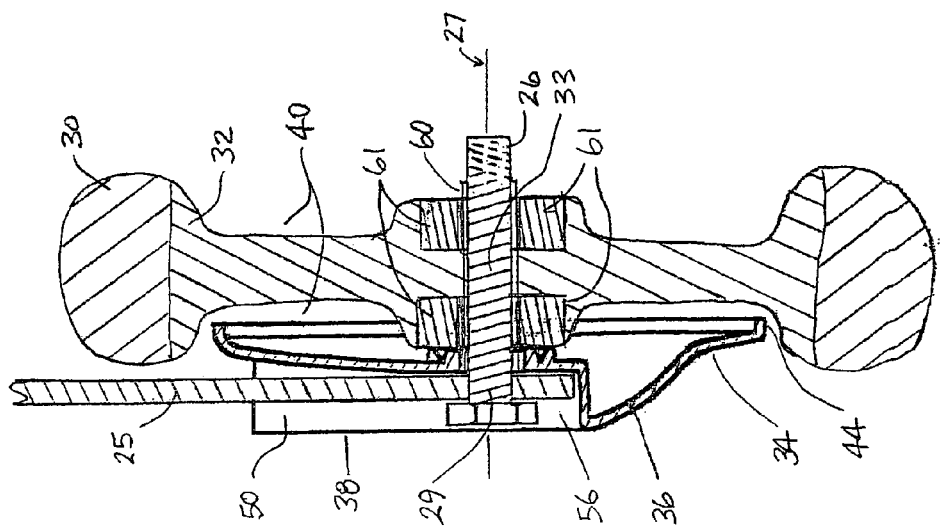
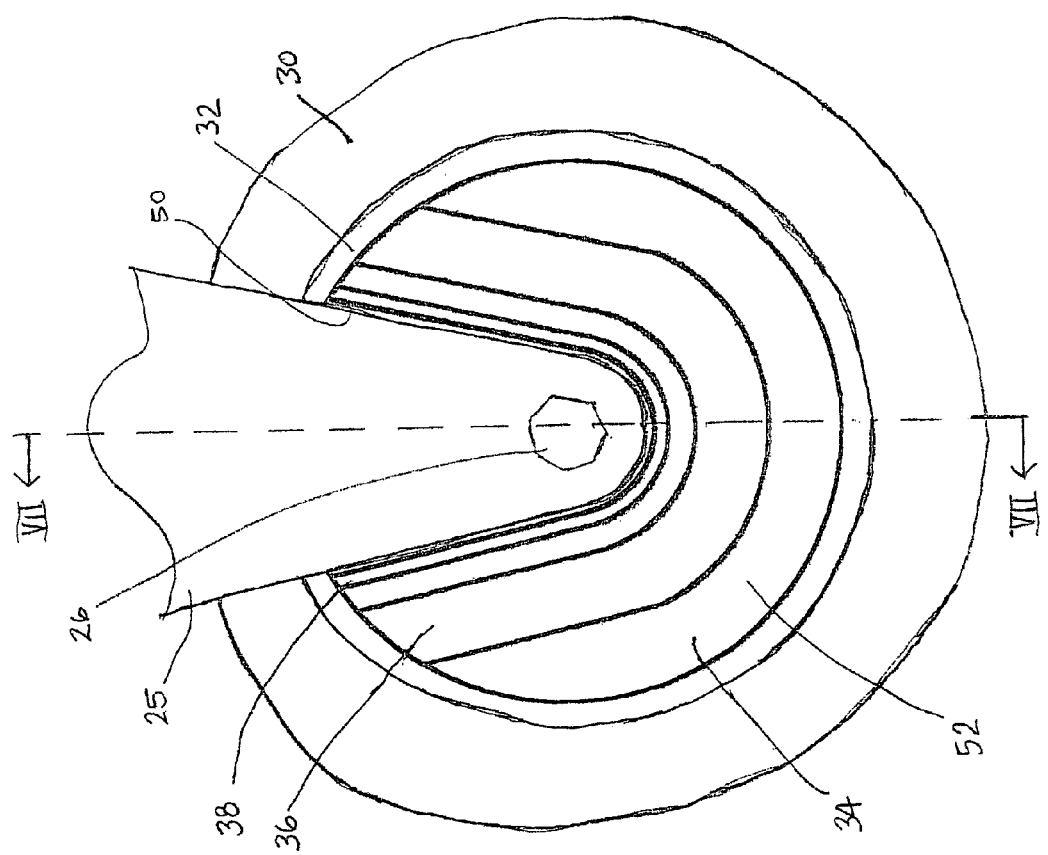

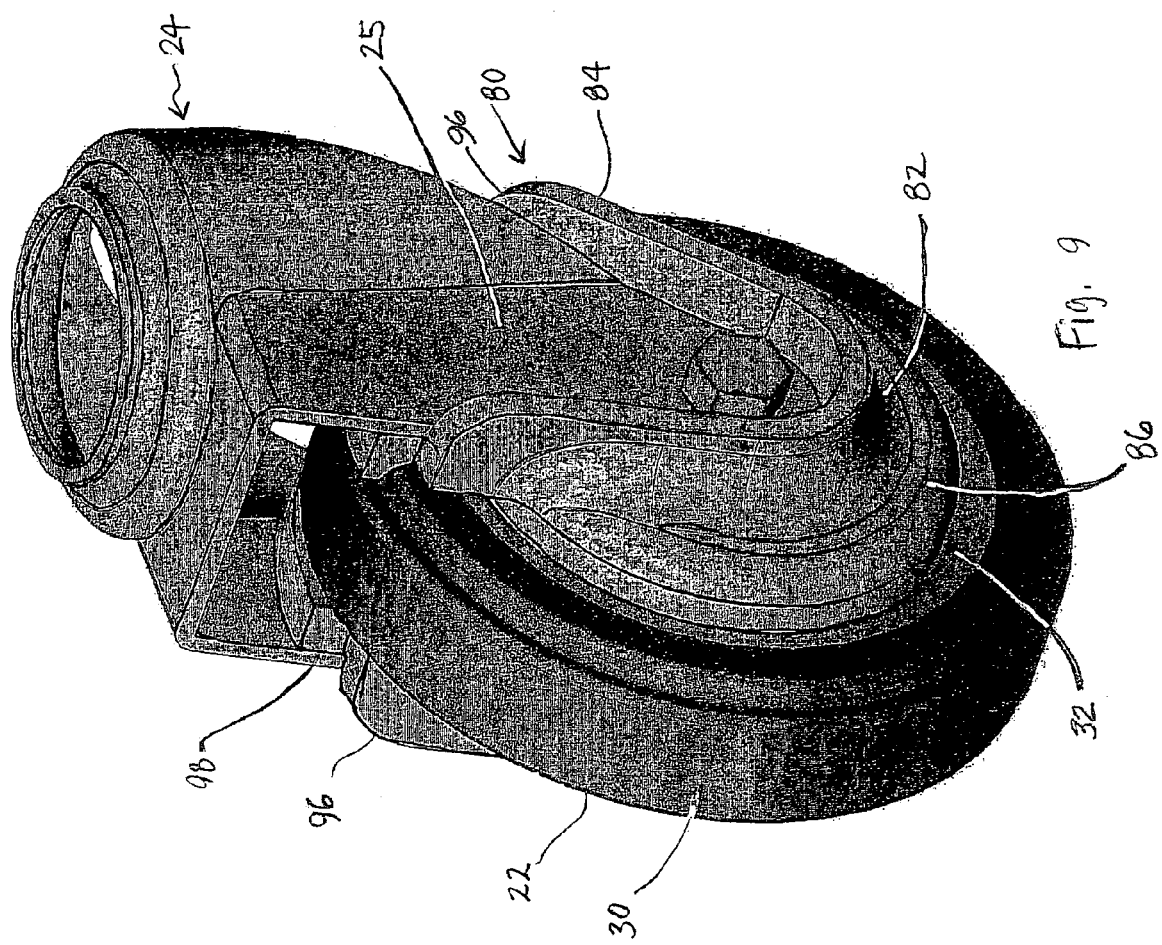

CASTER THREAD GUARD AND CASTER ASSEMBLY

CROSS-REFERENCE TO RELATED APPLICATIONS

This application claims the benefit of U.S. Provisional Application No. 60/510,464, filed Oct. 10 2003.

BACKGROUND OF THE INVENTION

1. Field of the Invention

The present invention relates generally to caster assemblies for material handling carts, and more particularly to a caster assembly having a thread guard to help prevent strands of foreign material from wrapping around the caster axle.

2. Description of the Prior Art

A caster is a wheel or rotating ball mounted in a swivel frame that may be used for the support and movement of furniture, trucks, portable equipment, material handling carts, and the like. The swivel frame may be referred to as a "caster horn" or "yoke," and the yoke may be said to have "yoke legs," which extend toward the wheel on either side of the wheel. Because the caster wheel is frequently mounted with an offset in a swivel frame (i.e., a frame where a swivel axis is offset from an axle axis), the wheel usually rotates in one direction with the wheel trailing the swivel mounting.

When the caster is used in an environment that has strands of material on the floor, the caster wheel may pick up a strand and wrap it around the axle. Such strands of material may include hair, string, threads from clothing, mop strings, or the like. The strands may be picked up by the wheel because the strands are very light, or because the surface of the wheel may be tacky due to wetness or other sticky substances that may be on the wheel tread.

Although any wheel may accumulate strands around its axle, this problem is more severe when the caster wheel rotates primarily in one direction. A strand wrapped over or around the axle will tend to stay there as other strands accumulate on top, and the strands are pulled tighter as they are all wrapped in the same direction. These accumulated strands may interfere with the smooth operation of the bearing, and may trap dirt and other contaminants near the bearings, which may reduce the function or the life of the bearing. Strands collected around the axle are also unsightly and may leave a poor impression in a customer's mind, reflecting upon the quality and cleanliness of a retail store as the customer operates a dirty, wobbly, and hard-to-push shopping cart.

For these reasons, caster designers continue to pursue designs that discourage the wrapping of strands of material around the axle of a wheel.

In the prior art, many manufactures offer devices called "thread guards." For example, a thread guard is disclosed in U.S. Pat. No. 5,518,322 granted to Hicks on May 21, 1996, which is incorporated herein by reference. The Hicks thread guard is circular, with an opening for the axle bolt in the center. The thread guard does not rotate with the wheel; it is stationary with respect to the caster yoke. The thread guard extends radially from the plane of the axle opening and then curves toward the medial plane of the wheel hub, extending to points inside the concave recess in the hub (i.e., inside the plane of the outer hub face).

Other designs may use the shape and configuration of the yoke legs as a thread guard.

There continues to be a need for an improved thread guard and caster assembly that either prevents or reduces the likelihood that strands picked up by the wheel will become wrapped around the axle. Such a thread guard will improve the performance and reliability of wheels used on material handling carts, and will help maintain the aesthetically pleasing appearance and operation of a new caster.

BRIEF SUMMARY OF THE INVENTION

The present invention provides an improved thread guard and caster assembly. The caster includes a yoke having a first yoke leg and a second yoke leg with a yoke leg axle opening through the yoke legs. A wheel having a hub and a hub axle opening through the hub is attached to the first and second yoke leg with an axle bolt. A thread guard is located between the hub and the yoke leg. The thread guard has a disk-shaped body with a thread guard axle opening through the body for receiving the axle bolt. The thread guard further includes an outer surface facing toward the yoke leg and an inner surface facing toward the hub, and the outer surface includes a raised ridge extending away from the thread guard body. The ridge substantially surrounds and conforms to the shape of the yoke leg. The ridge preferably extends from the body past the outer surface of the yoke leg.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which:

FIG. 4 is an elevational view that shows an outer surface of the thread guard in accordance with the present invention;

FIG. 5 is a sectional view of the thread guard taken along line V—V in FIG. 4;

FIG. 6 is a side elevational view of a portion of a caster assembly in accordance with the present invention;

FIG. 7 is a sectional view of the portion of the caster assembly taken along line VII—VII in FIG. 6;

FIGS. 8 and 9 are perspective views of a caster assembly having an alternate embodiment of the thread guard in accordance with the present invention;

DESCRIPTION OF THE PREFERRED EMBODIMENTS

Figure 1:
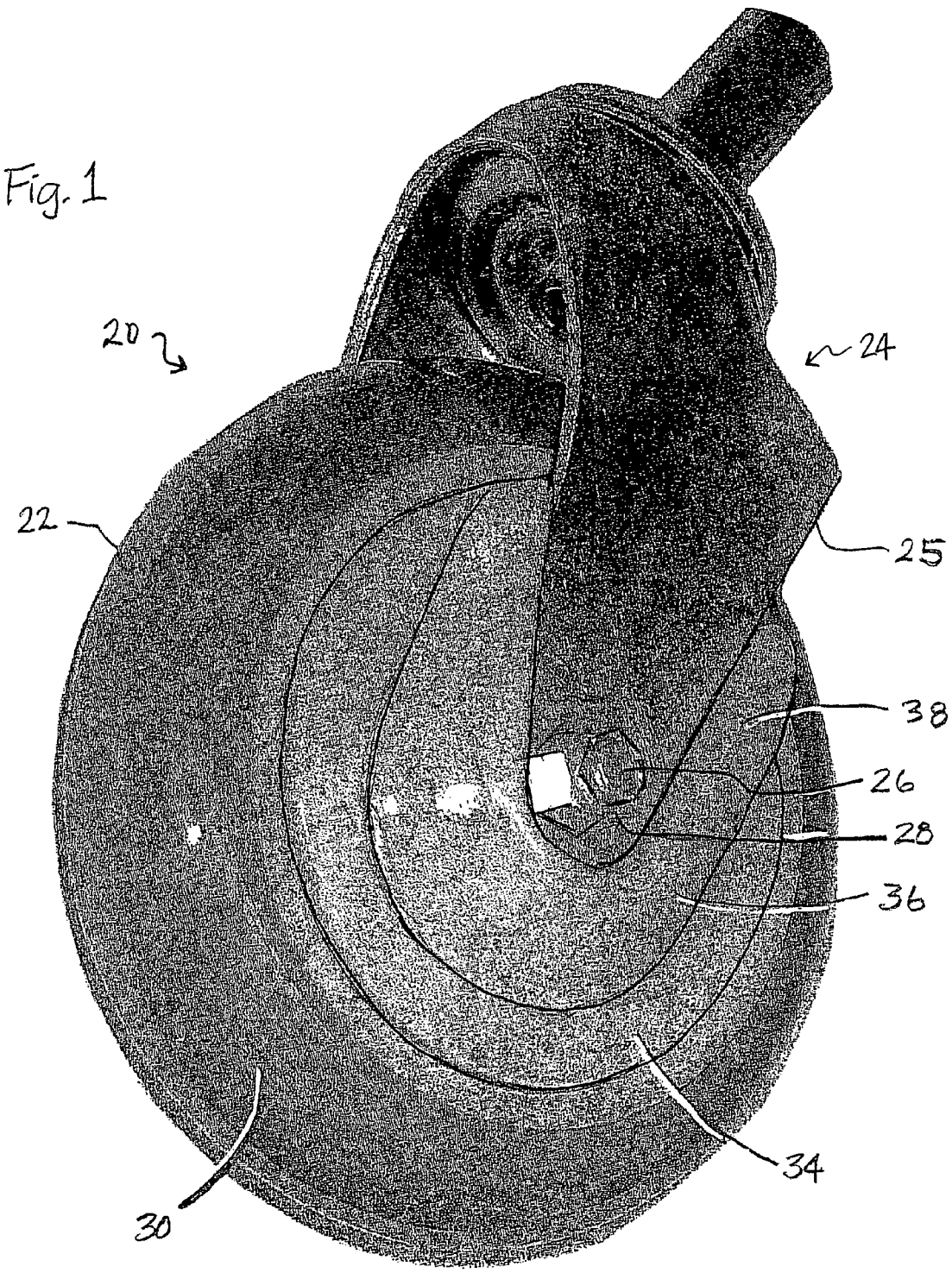
FIG. 1 is a perspective view of a caster assembly with a thread guard in accordance with the present invention.
Figure 3:
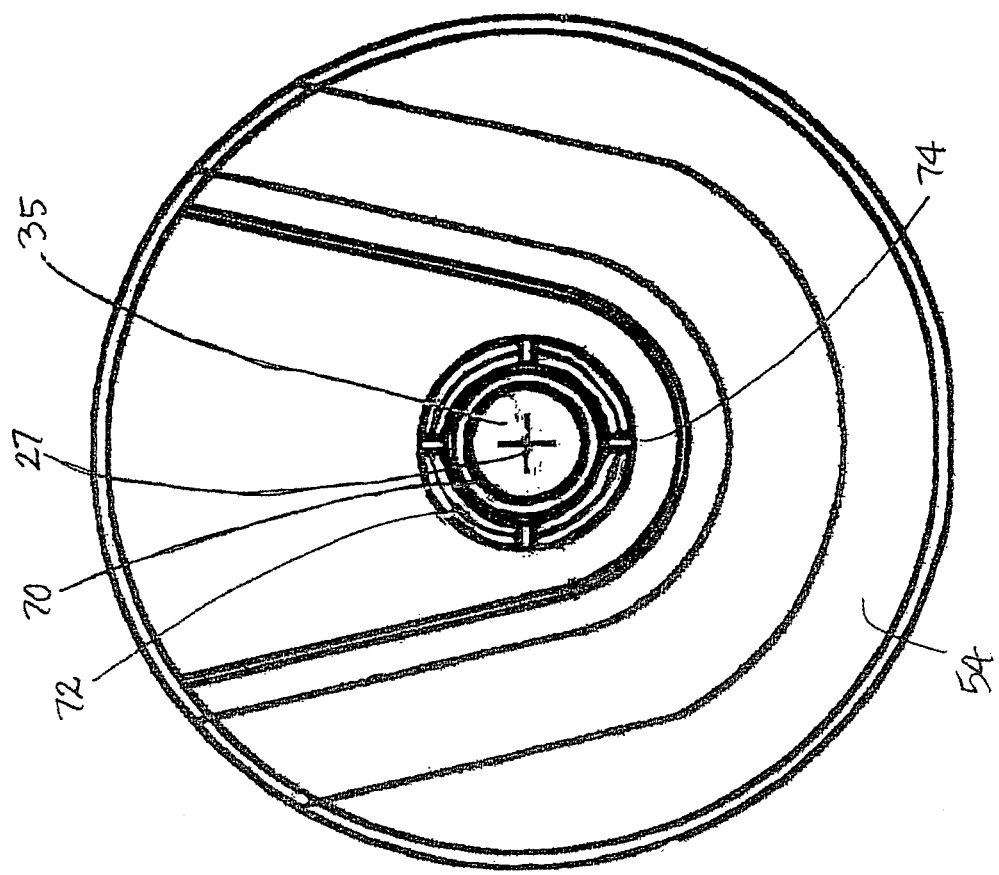
FIG. 3 is an elevational view that shows an inner surface of the thread guard in accordance with the present invention.

With reference now to the drawings, and in particular with reference to FIG. 1, there is depicted a caster having a thread guard in accordance with the present invention. As shown, caster 20 includes wheel 22 mounted in yoke 24 with axle bolt 26 secured by nut 28. In a preferred embodiment, yoke 24 has two spaced-apart yoke legs 25. Wheel 22 is received between yoke legs 25. Each yoke leg 25 has an axle opening 29. Tread 30 surrounds hub 32 (see FIG. 7). Hub 32 has axle opening 33.

To promote smooth, steady operation and long wheel life, the wheel hub and axle area of wheel 22 is protected from strands, contaminants, dirt, and other foreign material by a thread guard. As shown in the embodiment of FIGS. 1–4 and 6, thread guard 34 is generally circular and disk shaped about axle bolt 26, with a diameter that covers most of hub 32 when it is installed between hub 32 and yoke 24. Preferably, caster 20 uses two thread guards 34, with one located on either side of wheel 22.

The disk shape of thread guard 34 has an axle opening 35 in the center for receiving axle bolt 26, which is positioned perpendicular to the plane of the disk. A longitudinal axis of axle bolt 26 is positioned concentric with wheel axis 27. The disk shape of thread guard 34 has an outer surface 52, which faces outward from wheel 22 and toward yoke leg 25 when it is installed. An inner surface 54 of thread guard 34 faces toward hub 32.

According to an important aspect of the present invention, thread guard 34 includes ridge 36 that is raised above, or extends outward from, outer surface 52 of the disk shape, thus extending away from hub 32. Ridge 36, which is shown most clearly in FIGS. 1, 2, and 4–7, substantially surrounds and conforms to the shape or outline of yoke leg 25. Ridge 36 defines a cavity or recess 56, which cavity receives yoke leg 25. The most raised or most extended line along the top of ridge 36 defines crest 38. Crest 38 is preferably rounded and smooth so that it will not snag strands of material picked up by wheel 22. As shown, crest 38 (and similarly, a crest line that lies along crest 5 38) lies in a single plane. However, the line along crest 38 need not lie in a single plane.

As may be seen most clearly in the section view of FIG. 7, which is view is taken along line VII—VII of FIG. 6, crest 38 preferably extends out from the outer surface 52 to at least the furthest extent, measured from the medial plane of the wheel, of the outside face of yoke leg 25. Better still, crest 38 extends to the end of axle bolt 26, and may extend somewhat beyond the end. The extension height of crest 38 should be sufficient to divert a falling strand, or a strand clinging to tread 30, away from yoke leg 25 and away from the end of axle bolt 26, where it may be snagged and subsequently become wrapped around the axle. When two thread guards 34 are used on either side of wheel 22, crests 38 extend beyond the respective ends of axle bolt 26, including nut 28.

The slope of ridge 36 in the area of outer ridge slope 48 (shown in FIG. 5), where ridge 36 rises from a level near the level of outer edge 44 to crest 38, is gradual and varies smoothly so that strands will not snag or catch on ridge 36. In operation, thread guard 34 does not rotate; it remains stationary with respect to yoke 24. As a strand is picked up on rotating tread 30 and moved upward and dragged across the smooth, outward-rising surface of outer ridge slope 48 it is likely to be pulled away from hub 32 and axle bolt 26 when it is dragged across the sloping shape of the ridge. Thus, the shape of ridge 36 should not snag strands, and should tend to move strands outward from hub 32 so that the strand picked up by wheel 22 will fall to the floor without engaging yoke leg 25, axle bolt 26, or nut 28.

In addition to extending beyond the end of axle bolt 26, thread guard 34 loosely fits into and covers a concave recessed portion 40 of hub 32, as shown in FIGS. 6 and 7. This fit is loose because a small clearance exists between outer edge 44 of stationary thread guard 34 and rotating hub 32. This clearance should be small, preferably in the range of 0.600 millimeters (mm) to 0.800 mm, so that thread guard 34 can shield the wheel hub, bearing, and axle from strands, dirt, and other contaminants. Thus, thread guard 34 covers and shields a substantial portion of hub 32 from fibers and other contaminants.

Figure 2:
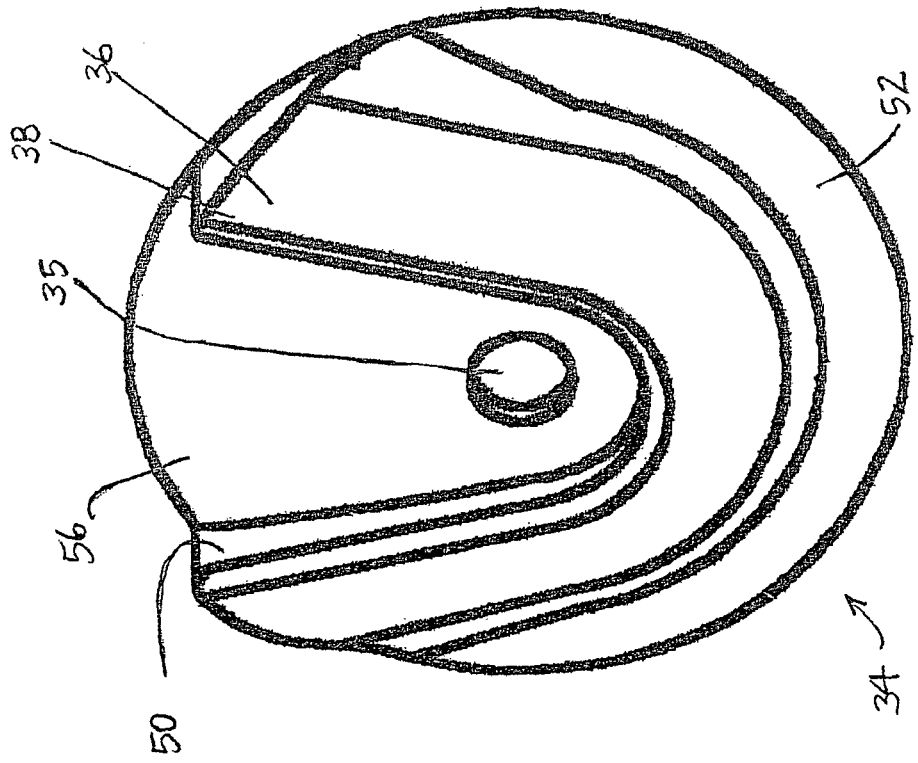
FIG. 2 is perspective view showing an outer surface of the thread guard in accordance with the present invention.

To provide some mechanical support and to keep thread guard 34 from rotating, inner ridge face 50, which is shown in FIGS. 2 and 5 on the side of crest 38 toward axle opening 35, is located close to yoke leg 25 and may touch yoke leg 25. The slope of inner ridge face 50 is typically steeper than the slope of outer ridge slope 48 so that yoke leg 25 can be nestled into yoke leg recess 56, where ridge 36 shields yoke leg 25.

Figure 8:
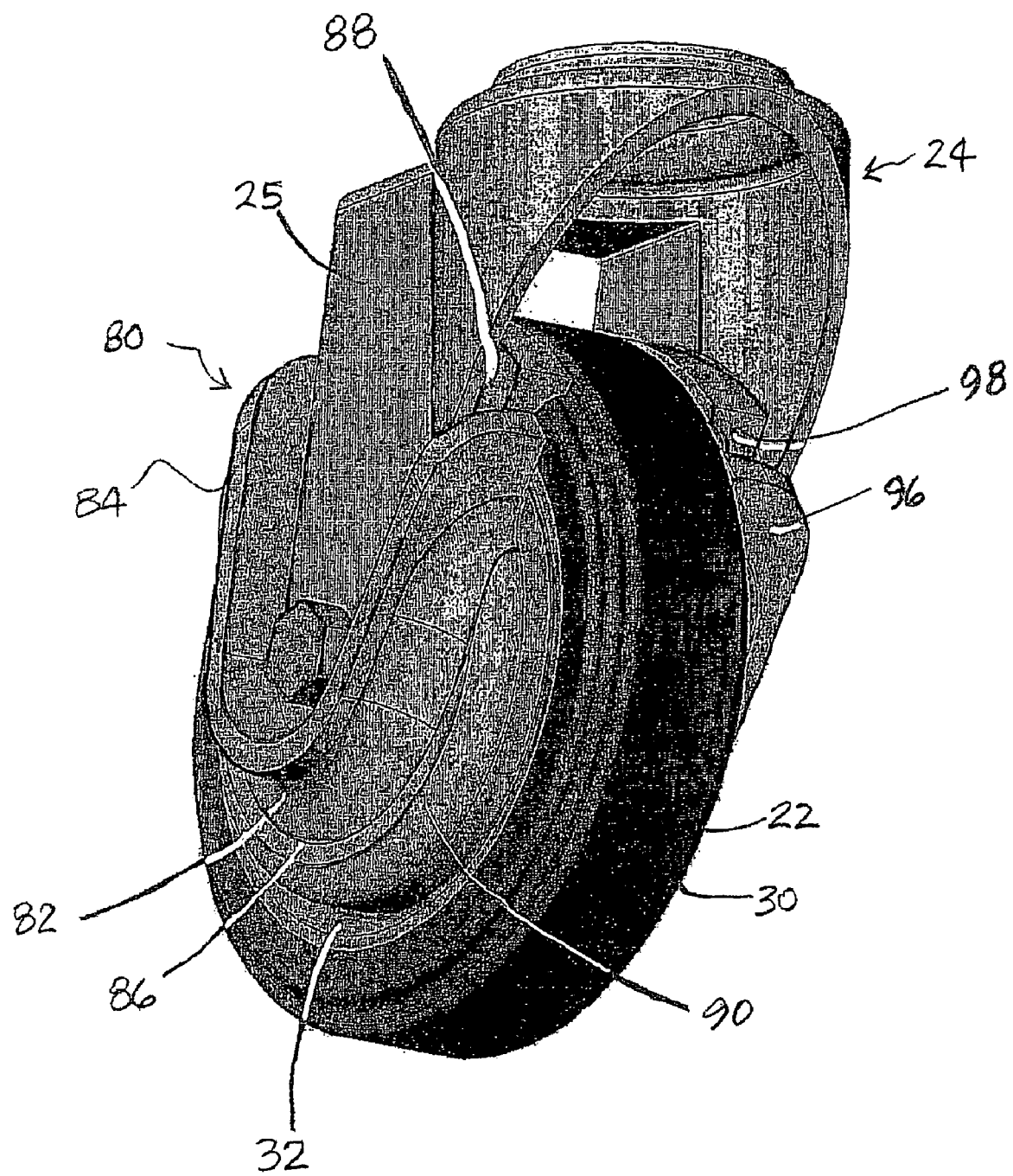

In alternate embodiments of the present invention, ridge 36 and crest 38 may have a different shape, and the portion of the disc shape behind yoke leg 25 may have a different shape, wherein either or both radially extend outside the diameter of the disk-shaped body and radially extend beyond the diameter of hub 32. For example, FIGS. 8 and 9 show perspective views of a caster assembly having an alternate embodiment of the thread guard 80 in accordance with the present invention. As shown, thread guard 80 has ridge 82 that is raised or extended further from the disk shape of outer surface 86. The most raised portions of ridge 82 may have a near vertical slope and crest 84 may have a flat top. Ridge 82 is also longer, following beside a greater length of the outside edge of yoke 24 and extending radially beyond the diameter of hub 32 to form ridge extension 96.

The area in yoke recess 88 is greater, extending radially beyond the disk shape of thread guard 80 to form yoke recess extension 98, and in some cases extending beyond the radius of hub 32. The portion that extends beyond hub 32 may wrap inward toward wheel 22, where it may conform to the shape of tread 30. In this embodiment, the area between outer surface 90 and the inside of yoke leg 25 is covered and filled to a greater extent so that there is less void or space that may retain material or fluid adjacent to the hub, bearing or axle. With this space closed, material lifted by the wheel above the axle may be diverted away from the hub and axle.

Figure 11:
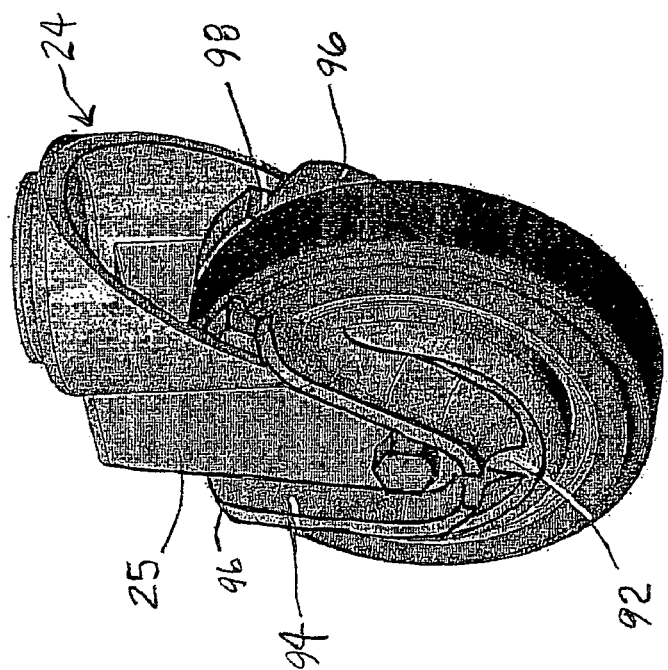
FIGS. 10 and 11 are perspective views of a caster assembly having yet another alternate embodiment of the thread guard in accordance with the present invention.
Figure 10:
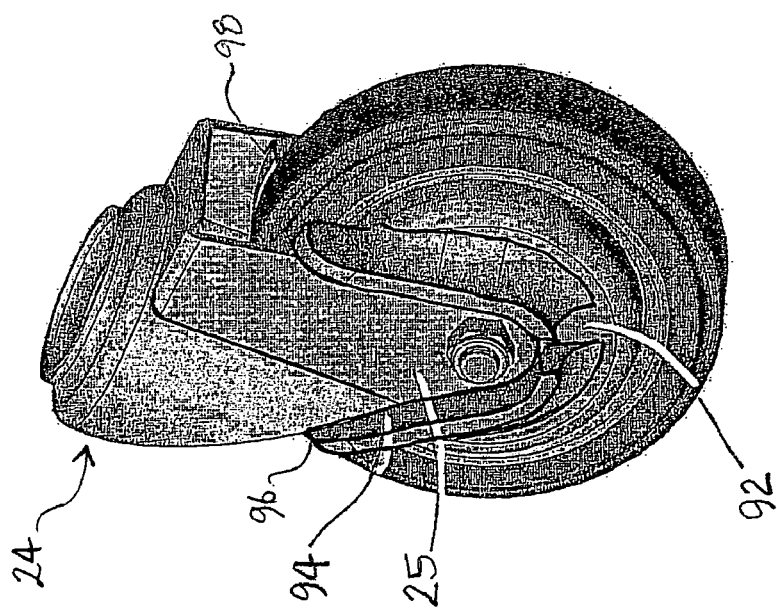

In other embodiments, the ridge may allow for drainage. For example, FIGS. 10 and 11 show isometric views of a caster assembly having an embodiment of the thread guard 80 that has a notch 92 for drainage in accordance with the present invention. As shown, thread guard 80 has ridge 82 with notch 92 at the lower extent of ridge 82, near the lowest point of yoke leg 25, near a point where wheel 22 would contact the ground surface upon which caster 20 rolls. As an alternative to notch 92, any needed means of drainage may be accomplished by a hole or other opening or passage that passes through ridge 82 from parts along inner ridge face 94 that might collect fluid and dirt.

Thread guard 34 is preferably made of injection molded plastic that is somewhat flexible.

During installation and assembly of caster 20, axle opening 35 (see FIG. 5) of thread guards 34 are friction fit or snapped onto bushing 60 (see FIG. 7), which surrounds axle bolt 26. If the axle opening 35 snaps to bushing 60, axle opening 35 may have an annular ridge or detent 63 (see FIG. 5) that snaps into an annular groove (not shown) around bushing 60. Bushing 60 may alternatively be part of bearing 61, such as when bearing 61 has an extended inner race. Bushing 60 may also be inserted through an inner race of bearing 61.

Inner surface 54 of thread guard 34 may include annular ridges 70 and 72 (see FIGS. 3 and 5), where ridge 70 is a solid ridge nearest axle opening 35 and ridge 72 has a larger radius and is segmented by radial notches 74. Notches 74 give threat guard 34 some flexibility.

Figure 12:
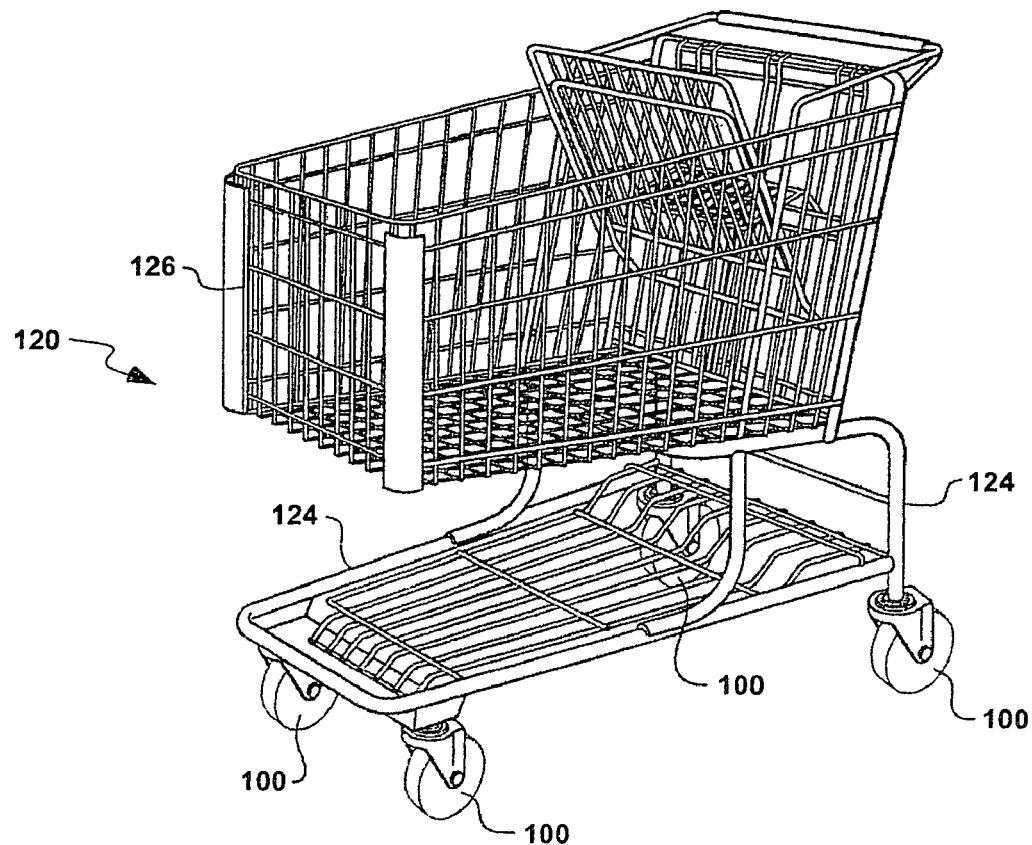
FIG. 12 is a side perspective view of a shopping cart having wheel and hub assemblies according to the present invention.

FIG. 12 depicts an embodiment of material handling cart in accordance with the present invention. As illustrated, cart 120 includes frame 124, material support structure 126—which may be implemented with a basket, platform, rack, or the like—and wheels 100. Wheels 100 include a thread guard, as described above in relation to the embodiments shown in FIGS. 1–11. Frame 124 includes vertical and horizontal members that support and bear the load of material placed on material support structure 126, and transfer such load to wheels 100. Cart 120 may also be implemented as a laundry cart, which is used in an environment that is particularly susceptible to a wheel picking up a thread that may be wrapped around the axle.

Wheels 100 may or may not be mounted to frame 124 with a swivel mounting, depending upon the application of cart 120. For example, if cart 120 is a shopping cart, the front wheels may swivel, and the back wheels may be mounted in a fixed orientation. If cart 120 is a laundry cart, all of the wheels may swivel.

Figure 13:
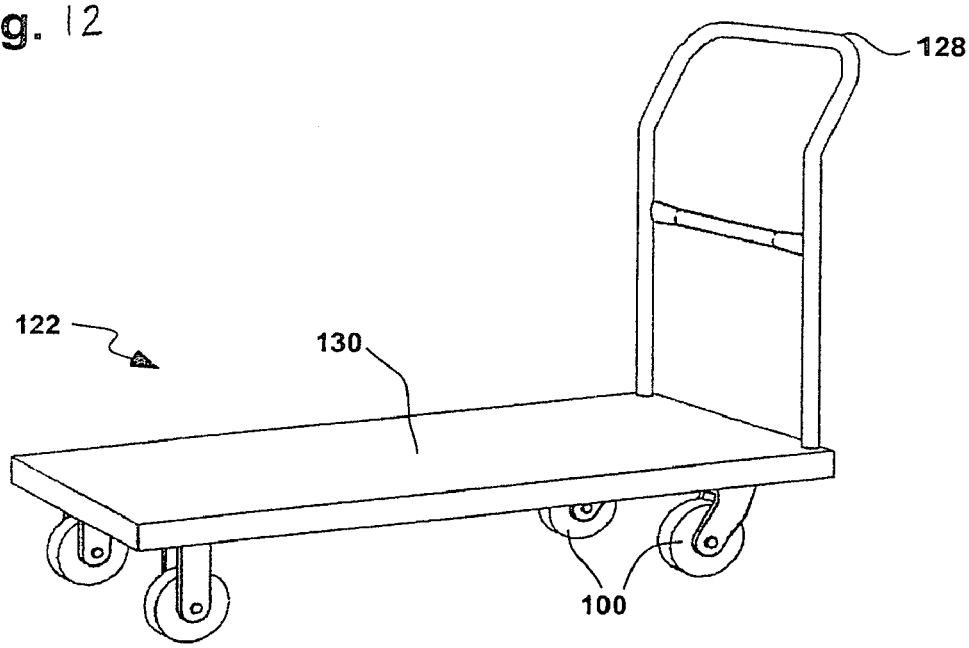
FIG. 13 is a schematic side elevational view of a flat cart with the wheel of the present invention.

FIG. 13 shows a flat cart 122 having a bed 130, for carrying objects, and a handle 128 for use in pushing or pulling the cart. Cart 122 uses wheels 100 having the thread guard of the present invention. Cart 122 is designed to carry heavy loads, such as lumber.

It should be apparent that the thread guard of the present invention protects and helps prevent foreign material from collecting and wrapping around the axle of a caster assembly. The thread guard has surfaces with shapes that guide and move strands away from the hub and axle of the wheel when any such strands are picked up by the rotating wheel. The thread guard helps maintain smooth caster operation and helps extend the life of the caster. It also helps to create a good impression about store cleanliness and attention to detail in the minds of customers that use shopping carts at retail stores. Using the thread guard can make cleaning and washing the carts quicker, easier, and less labor intensive.

The thread guard may be used with conventional and commercially available caster and yoke assemblies, which are used on a wide variety of material handling carts, such as shopping carts, laundry carts, clothes racks, push carts, utility carts, wire shelf carts, dollies, furniture casters, and the like. The thread guards may be installed by the original equipment caster manufacturer, or they may be sold separately for retrofit.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A caster assembly comprising:
   a yoke having a first yoke leg and a second yoke leg with a yoke leg axle opening through the first and second yoke legs;
   a wheel having a hub and a hub axle opening through the hub, wherein the wheel is attached to the first and second yoke legs with an axle bolt;
   a thread guard located between the hub and the first yoke leg, the thread guard having a disk-shaped body with a thread guard axle opening through the body for receiving the axle bolt, and wherein the thread guard further includes an outer surface facing toward the first yoke leg and an inner surface facing toward the hub, wherein the outer surface includes a raised ridge extending away from the body, wherein the ridge substantially surrounds and conforms to the shape of the first yoke leg and extends beyond the furthest extent of the axle bolt.

2. The caster assembly according to claim 1 wherein a most raised portion of the ridge defines a crest having a crest line that runs along the ridge, wherein the crest has a rounded and smooth shape.

3. The caster assembly according to claim 2 wherein the ridge has a gradual slope from the crest line down to the body surface in a direction away from the first yoke leg.

4. The caster assembly according to claim 2 wherein the ridge has an inner ridge face that has a steep slope from the crest line down to the body surface in a direction toward the first yoke leg.

5. The caster assembly according to claim 4 wherein the inner ridge face defines a yoke recess for receiving the first yoke leg.

6. The caster assembly according to claim 4 wherein the inner ridge face and the yoke recess conform to the first yoke leg so that the crest is proximate an outer edge of the first yoke leg.

7. The caster assembly according to claim 1 wherein the ridge extends beyond an outside surface of the first yoke leg.

8. The caster assembly according to claim 1 further including a second thread guard between the wheel and the second yoke leg, wherein the axle bolt passes through an axle opening in the second thread guard and a second yoke leg axle opening in the second yoke leg.

9. The caster assembly according to claim 1 wherein the ridge has an opening for draining fluid near a lowest extent of the first yoke leg, nearest to a point where the wheel would contact a ground surface.

10. The caster assembly according to claim 1 wherein the thread guard is made from injection molded plastic.

11. The caster assembly according to claim 1 wherein the caster assembly further includes a bushing surrounding the axle bolt, and the bushing has an annular groove, and wherein the thread guard further includes an annular ridge in the thread guard axle opening for engaging and fastening the thread guard to the bushing.

12. The caster assembly according to claim 1 wherein the ridge extends along an outside edge of the first yoke leg radially beyond an outer diameter of the disk-shaped body.

13. The caster assembly according to claim 1 wherein the disk-shaped shaped body substantially covers the hub of the wheel.

14. A thread guard in a caster assembly, the caster assembly having a wheel that is attached to a first yoke leg and a second yoke leg by an axle bolt, the thread guard comprising:

a disk-shaped body;

a thread guard axle opening through the body for receiving an axle bolt;

the body having an inner surface facing toward a hub of the wheel when assembled into the caster assembly, and having an opposite outer surface; and a raised ridge extending away from the outer surface of the body, wherein the ridge substantially surrounds and conforms to the outline of a shape of the first yoke leg when the first yoke leg and thread guard are assembled, wherein the ridge defines a yoke leg recess and extends beyond the furthest extent of the axle bolt when the thread guard is assembled in the caster assembly.

15. The thread guard according to claim 14 wherein a most raised portion of the ridge defines a crest having a crest line that runs along the ridge, wherein the crest has a rounded and smooth shape.

16. The thread guard according to claim 15 wherein the ridge defines a yoke recess on the outer surface of the body, wherein the yoke recess is adapted to receive the first yoke leg of the caster assembly, and wherein the ridge has an inner ridge face that has a steep slope from the crest line down to the yoke recess in a direction toward the yoke recess, and wherein the ridge has a gradual slope from the crest line down to the body surface in a direction away from the yoke recess.

17. The thread guard according to claim 14 wherein the ridge is raised from the outer surface of the body and extends beyond an outside surface of the first yoke leg when assembled in the caster assembly.

18. The thread guard according to claim 14 wherein the ridge has an opening for draining fluid.

19. The thread guard according to claim 14 wherein the thread guard is made from injection molded plastic.

20. The thread guard according to claim 14 wherein the ridge extends radially beyond an outer diameter of the disk-shaped body.

21. A material handling cart comprising:

a frame;

a material support structure coupled to the frame;

a plurality of wheels coupled to the frame, wherein one of the wheels includes:

a yoke having a first yoke leg, a second yoke leg with a yoke leg axle opening through the first and second yoke legs;

a wheel having a hub and a hub axle opening through the hub, wherein the wheel is attached to the first and second yoke legs with an axle bolt;

a thread guard located between the hub and the first yoke leg, the thread guard having a disk-shaped body with a thread guard axle opening through the body for receiving the axle bolt, and wherein the thread guard further includes an outer surface facing toward the first yoke leg and an inner surface facing toward the hub, wherein the outer surface includes a raised ridge extending away from the body, wherein the ridge substantially surrounds and conforms to the shape of the first yoke leg and extends beyond the furthest extent of the axle bolt.

22. The material handling cart according to claim 21 wherein the ridge extends beyond an outside surface of the first yoke leg.

23. The material handling cart according to claim 21 wherein a most raised portion of the ridge defines a crest line that runs along the ridge, and wherein the ridge has a gradual slope from the crest line down to the body surface in a direction away from the first yoke leg.

24. The material handling cart according to claim 21 wherein a most raised portion of the ridge defines a crest line that runs along the ridge, and wherein the ridge has an inner ridge face that has a steep slope from the crest line down to the body surface in a direction toward the first yoke leg.

25. The material handling cart according to claim 24 wherein the inner ridge face defines a yoke recess for receiving the first yoke leg, and wherein the yoke recess conforms to the first yoke leg so that the crest is proximate to an outer edge of the first yoke leg.

26. The material handling cart according to claim 21 wherein the ridge extends along an outside edge of the first yoke leg beyond an outer diameter of the disk-shaped body.

* * * * *